(12) United States Patent
Sinico et al.

(10) Patent No.: US 11,560,896 B2
(45) Date of Patent: Jan. 24, 2023

(54) DEVICE FOR PROTECTING AN ELECTRIC PUMP AGAINST OVERPRESSURES

(71) Applicant: DAB PUMPS S.P.A., Mestrino (IT)

(72) Inventors: Francesco Sinico, Montecchio Maggiore (IT); Luca Casalini, Pontedera (IT)

(73) Assignee: DAB PUMPS S.P.A., Mestrino (IT)

( * ) Notice: Subject to any disclaimer, the term of this patent is extended or adjusted under 35 U.S.C. 154(b) by 134 days.

(21) Appl. No.: 16/935,737

(22) Filed: Jul. 22, 2020

(65) Prior Publication Data
US 2021/0025400 A1  Jan. 28, 2021

(30) Foreign Application Priority Data
Jul. 25, 2019  (IT) .................. 102019000012855

(51) Int. Cl.
*F04D 15/00* (2006.01)
*F04D 13/06* (2006.01)
*F16K 17/04* (2006.01)
*F04D 9/00* (2006.01)
*F04D 9/02* (2006.01)
(Continued)

(52) U.S. Cl.
CPC ......... *F04D 15/0022* (2013.01); *F02M 37/10* (2013.01); *F04D 9/005* (2013.01); *F04D 9/02* (2013.01); *F04D 13/06* (2013.01); *F04D 15/0005* (2013.01); *F04D 15/0011* (2013.01); *F16K 15/026* (2013.01);
(Continued)

(58) Field of Classification Search
CPC ............. Y10T 137/7932; F16K 15/063; F16K 15/026; F16K 17/04; F04D 9/005; F04D 15/0005; F04D 9/02; F04D 15/0011; F04D 15/0022; F04D 13/06; F02M 37/10
See application file for complete search history.

(56) References Cited

U.S. PATENT DOCUMENTS 2,786,485 A    3/1957  Steirly
2,949,928 A *  8/1960  Hobson ................... E04F 21/08
                                                137/454.2
(Continued)

FOREIGN PATENT DOCUMENTS

JP      S59-103087 A    6/1984
WO    WO 2009/010844 A1  1/2009

OTHER PUBLICATIONS

Italian Search Report dated Feb. 6, 2020 issued in IT 201900012855, with partial translation.

*Primary Examiner* — Peter J Bertheaud
(74) *Attorney, Agent, or Firm* — Scully, Scott, Murphy & Presser, P.C.

(57) ABSTRACT

A device for protecting an electric pump against overpressures, which comprises a main body which forms a cavity with an axis of extension which is substantially parallel to an axis of extension of the main body and a flow control element which can slide in the cavity along the axis of extension of the cavity between a closed position, in which the flow control element affects an inlet of the cavity which can be connected fluidically to a delivery port of an electric pump, and an open position, in which the flow control element clears at least partially the inlet so as to place it in fluidic connection with an outlet of said cavity, elastic means designed to push the flow control element in response to the pressure that is present in the delivery port.

8 Claims, 3 Drawing Sheets

(51) Int. Cl.
  *F16K 15/06*   (2006.01)
  *F16K 15/02*   (2006.01)
  *F02M 37/10*   (2006.01)

(52) U.S. Cl.
  CPC ............ *F16K 15/063* (2013.01); *F16K 17/04* (2013.01); *Y10T 137/7932* (2015.04)

(56) References Cited

U.S. PATENT DOCUMENTS

| | | | | |
|---|---|---|---|---|
| 3,702,141 | A | * | 11/1972 | Wetterhorn ........... F16K 17/082 137/542 |
| 3,756,273 | A | * | 9/1973 | Hengesbach ......... F16K 15/026 137/543.13 |
| 5,390,993 | A | * | 2/1995 | Beck ....................... B60T 8/341 267/202 |
| 6,715,471 | B2 | * | 4/2004 | Hiraiwa .................. F04D 5/002 137/543.17 |

* cited by examiner

DEVICE FOR PROTECTING AN ELECTRIC PUMP AGAINST OVERPRESSURES

The present invention relates to a device for protecting an electric pump against overpressures and also relates to an electric pump equipped with said device.

As is known, electric pumps are electrically actuated hydraulic machines designed to lift or move liquids which, once aspirated, are directed toward user devices of various kinds.

Electric pumps are generally inserted in pumping systems, water lifting systems and in general in hydraulic systems, which are often subject to sudden pressure variations caused by instantaneous flow interruptions, due for example to the sudden closure of a valve.

These sudden interruptions create hydraulic phenomena which are better known as hammering.

Hammering essentially consists of a pressure shock wave that is generated due to the inertia of a column of liquid in motion which strikes a wall and tries to reverse its flow.

The intensity of the hammering and the value of the maximum pressure of the wave can reach such levels as to ruin the ducts and damage the electric pumps irreparably.

Accordingly, electric pumps are generally protected against hammering by inserting expansion vessels in the hydraulic systems, i.e., hydraulic components that are essentially constituted by a rigid container divided into two chambers with a variable volume, one containing liquid of the circuit, the other containing a compressible fluid, generally air, which is preloaded at a given pressure.

These expansion vessels contain inside them an elastic membrane that delimits the two chambers mentioned above.

Although this solution is advantageous in some respects, it is not however free from drawbacks.

It should in fact be considered that expansion vessels have even considerable space occupations and therefore their installation is often hindered by the limited space available.

Such membrane is often subject to wear and rupture and therefore the vessels can be expensive to maintain.

The aim of the present invention is to provide a device for protecting an electric pump against overpressures that overcomes the drawbacks of the cited background art.

Within this aim, an object of the invention is to provide a device that is capable of compensating for or suppressing instantaneous increases in the pressure of the fluid pumped by an electric pump and which at the same time has a limited space occupation.

Another object of the invention is to provide a device that helps to avoid substantially all destructive phenomena linked to overpressures and in particular allows to contrast the phenomenon known as hammering.

Another object of the invention is to provide a device that is reliable and has a high precision in operation.

Another object of the invention is to provide a device that is relatively simple to provide and can be obtained at competitive costs.

This aim, as well as these and other objects which will become better apparent hereinafter, are achieved by a device for protecting an electric pump against overpressures, characterized in that it comprises a main body which forms a cavity with an axis of extension which is substantially parallel to an axis of extension of said main body and a flow control element which can slide in said cavity along said axis of extension of the cavity between a closed position, in which said flow control element affects an inlet of said cavity which can be connected fluidically to a delivery port of an electric pump, and an open position, in which said flow control element clears at least partially said inlet so as to place it in fluidic connection with an outlet of said cavity, elastic means designed to push said flow control element in response to a pressure that is present in said delivery port.

The invention also relates to an electric pump, comprising a pump body provided with a chamber adapted to accommodate at least one impeller turned by motor means, said chamber comprising at least one intake port and at least one delivery port, characterized in that it comprises said device for protecting an electric pump against overpressures.

Further characteristics and advantages of the invention will become better apparent from the description of a preferred but not exclusive embodiment of a device and of an electric pump according to the invention, illustrated by way of non-limiting example in the accompanying drawings, wherein.

Figure 1:
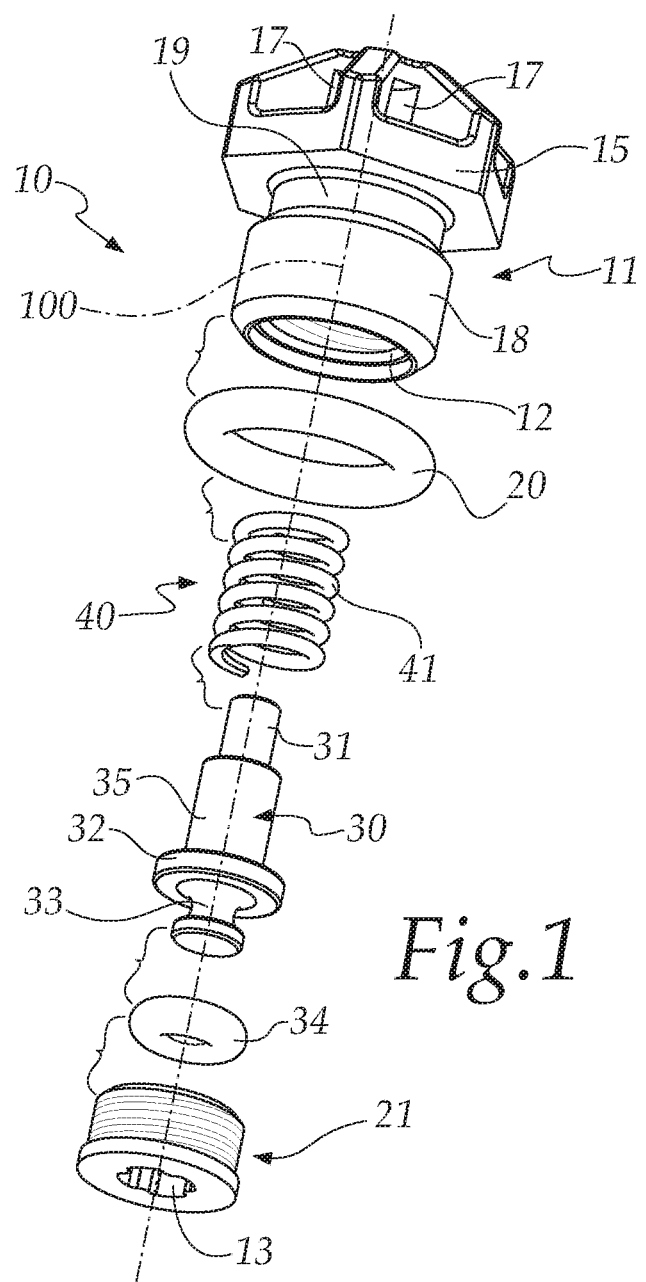
FIG. 1 is an exploded perspective view of the device according to the invention.
Figure 2:
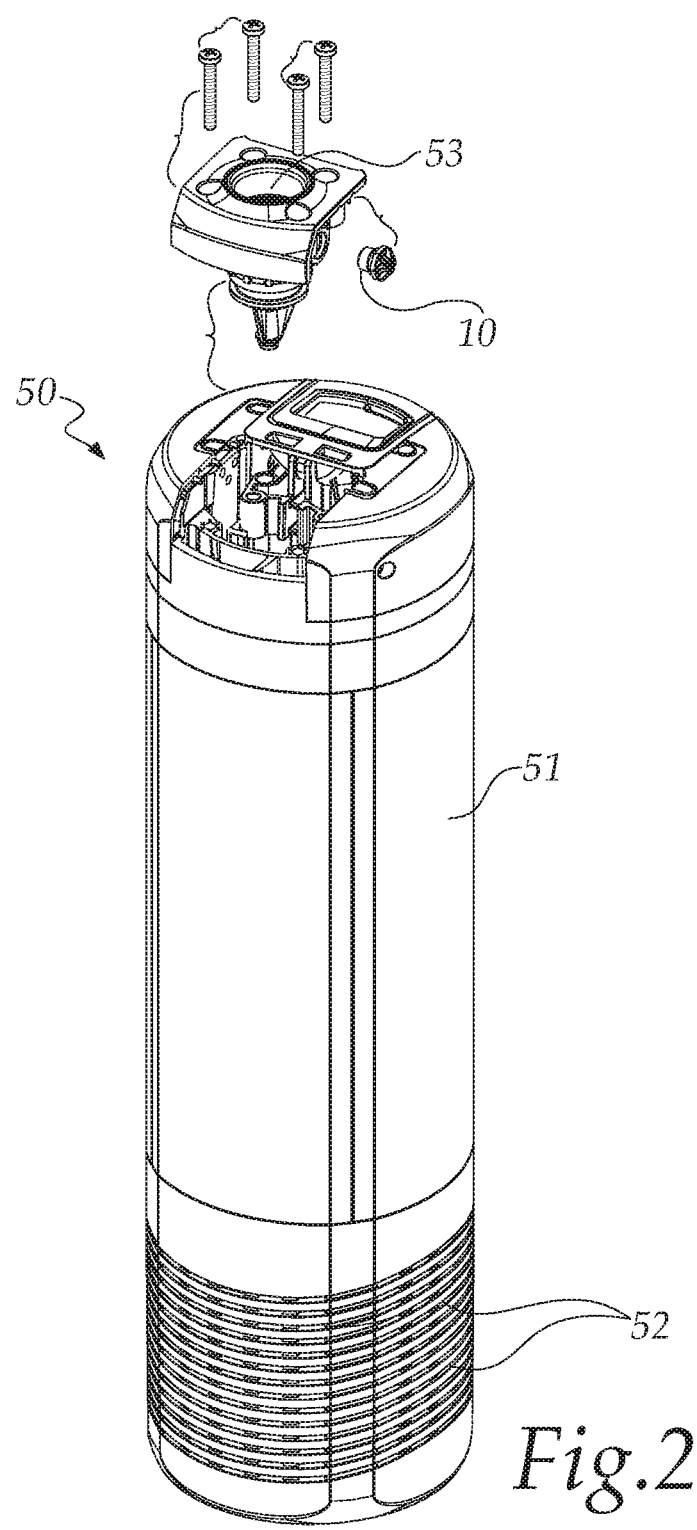
FIG. 2 is an exploded perspective view of an electric pump according to the invention.
Figure 3:
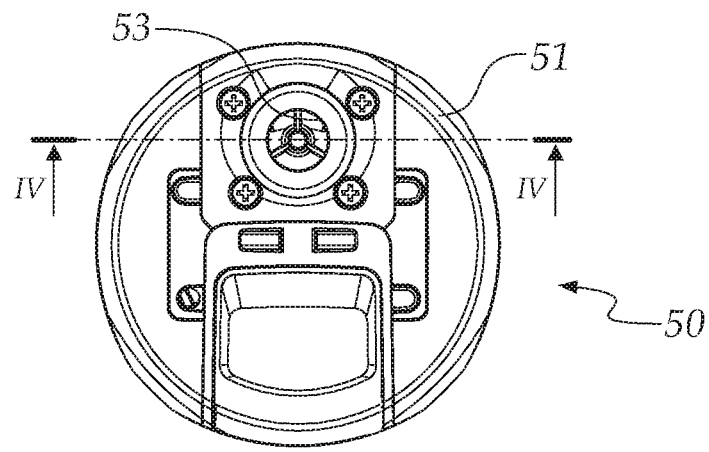
FIG. 3 is a top view of the electric pump of FIG. 2.
Figure 4:
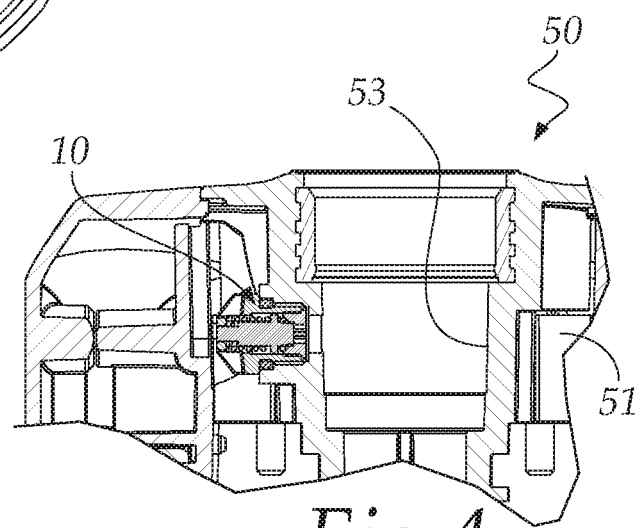
FIG. 4 is a sectional view, taken along the plane Iv-Iv of FIG. 3, of the device according to the invention, installed on an electric pump according to the invention.
Figure 5:
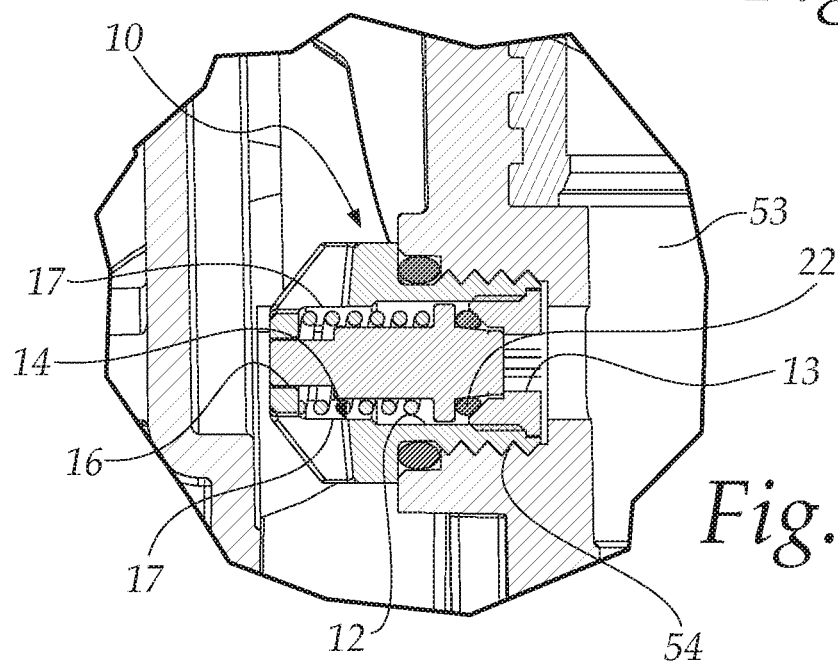
FIG. 5 is an enlarged-scale view of a portion of the cross-section of FIG. 4.

With reference to the figures, the device for protecting an electric pump against overpressures, according to the invention, is shown on its own in the exploded view of FIG. 1, in which it is designated generally by the reference numeral 10.

In the specific case, the device 10 is designed to be mounted in an electric pump 50 according to the invention, shown in FIGS. 2 to 5.

The device 10 comprises a main body 11 which, together with a secondary body 21, forms a cavity 12 that has a substantially cylindrical and elongated shape along an axis of extension 100.

An inlet 13, designed to be placed in fluid connection with a delivery port 53 of the electric pump 50, and an outlet 14, which is in fluid connection with the environment in which the electric pump 50 is located, are formed at the two opposite ends of the cavity 12.

In the specific case, the inlet 13 is formed by a through opening formed in the secondary body 21, which has a substantially cylindrical shape and is at least partially inserted in a fixed or removable manner in the cavity 12.

The secondary body 21 is provided with a thread, not shown in the figures, which is threaded complementarily to the cavity 12.

The outlet 14 is instead formed proximate to a contoured head 15 which protrudes axially from one end of the main body 11.

Advantageously, the contoured head 15 is provided with a series of radial openings 17 in fluid communication with the outlet 14.

The radial openings 17 are preferably configured so as to allow an outflow of the water along a direction that is transverse to the axis of extension 100.

In the specific case, the contoured head 15 substantially has the shape of a prism with a hexagonal base on which a pyramid or a truncated pyramid lies and in which six radial openings 17 open.

However, it is evident to the person skilled in the art that the contoured head of the device according to the invention can have a variable shape and dimensions, and likewise the number and geometric characteristics of the radial openings may vary.

At the end of the main body 11 that is opposite the end from which the contoured head 15 protrudes there is instead a threaded portion 18 designed to be coupled to a corresponding complementarily threaded portion 54 of a coupling that is provided on the electric pump 50 and is arranged in fluid communication with the delivery port 53 of the latter.

Advantageously, a first substantially annular groove 19 is provided on the outer surface of the main body 11 and is arranged between the contoured head 15 and the threaded portion 18.

The first groove 19 is configured to accommodate first sealing means 20, for example a first O-ring, which are designed to be arranged between the contoured head 15 and said coupling provided on the electric pump 50 when the device 10 is mounted on said pump.

A flow control element 30 is accommodated in the cavity 12 and can slide within the device 10 along the axis of extension 100.

More precisely, the flow control element 30 can move between a closed position, in which it affects the inlet 13, and an open position, in which the flow control element 30 clears at least partially the inlet 13 so as to place it in fluidic connection with the outlet 14.

In practice, in the open position the delivery port 53 is in fluid connection with the environment in which the electric pump 50 is located.

The flow control element 30 comprises a cylindrical body 35 from which a pin 31 protrudes, at an axial end; said pin is accommodated slidingly in a sliding seat 16 which is formed in the contoured head 15 and is substantially parallel to the axis of extension 100.

A shoulder 32 is instead formed at the end of the flow control element 30 that is opposite the one from which the pin 31 protrudes and contributes to form a second groove 33 which is configured to accommodate second sealing means 34, which for example consist of a second O-ring.

The second sealing means 34 are configured to cooperate, in the closed position, with an abutment seat 22 that is formed by the secondary body 21 around the inlet 13.

Conveniently, the device 10 also comprises elastic means 40 which adjust the position of the flow control element 30 in response to the pressure that is present in the delivery port 53.

In the specific case, the elastic means 40 consist of a spring 41 which is mounted coaxially on the flow control element 30.

The two opposite ends of the spring 41 abut respectively against the shoulder 32 and against the inside of the contoured head 15.

Advantageously, the spring 41 is calibrated so as to be compressed elastically when a preset pressure value is exceeded in the delivery port 53, so as to allow the axial sliding of the flow control element 30, producing the transition from the closed position to the open position.

For example, for an electric pump 50 said threshold pressure can be set at a value of approximately 12 bars.

When the threshold pressure is exceeded, the inlet 13 is placed in fluid connection with the outlet 14 and accordingly the delivery port 53 is in fluid connection with the environment in which the electric pump 50 is located, an environment in which the water that caused the overpressure is expelled.

In the specific case, the electric pump 50 is of the submersed or submersible type and comprises a pump body 51 which forms a chamber inside which one or more impellers, not visible in the figures and rotated by an electric motor, are accommodated.

The chamber is provided with an intake port 52 and with the already mentioned delivery port 53.

However, it is evident to the person skilled in the art that in alternative embodiments of the present invention, not shown, the electric pump might be configured differently without thereby losing in generality.

The electric pump 50 according to the invention comprises a device 10, which is preferably mounted at the delivery port 53.

The operation of the device and of the electric pump according to the invention is simple and straightforward.

In case of a sudden increase in the pressure inside the delivery port 53, for example caused by hammering generated by the attempt to pump water into a pipe that is blocked for some reason, when a preset pressure value is exceeded the thrust of the spring 41 is overcome and the flow control element 30 passes from the closed position to the open position, in which the delivery port 53 is connected fluidically with the environment in which the electric pump 50 is located, and the water that caused the overpressure is expelled by means of the radial openings 17.

In practice it has been found that the invention achieves the proposed aims and objects, providing a device for protecting an electric pump against overpressures that allows to compensate for or suppress instantaneous increases in the pressure of the fluid pumped by an electric pump and at the same time has a modest space occupation, so much that it can be installed substantially on any type of electric pump.

In particular, the device according to the invention helps to avoid substantially all of the destructive phenomena linked to overpressures and even more particularly allows to contrast the phenomenon known as hammering.

Furthermore, the device according to the invention is reliable and precise in operation in addition to being relatively simple to provide and obtainable at competitive costs.

The invention thus conceived is susceptible of numerous modifications and variations, all of which are within the scope of the appended claims; all the details may furthermore be replaced with other technically equivalent elements.

In practice, the materials used, so long as they are compatible with the specific use, as well as the contingent shapes and dimensions, may be any according to the requirements and the state of the art.

The disclosures in Italian Patent Application No. 102019000012855 from which this application claims priority are incorporated herein by reference.

What is claimed is:

1. A device for protecting an electric pump against overpressures, comprising:
   a main body which forms a cavity with an axis of extension of the cavity which is substantially parallel to an axis of extension of said main body wherein said main body comprises a threaded portion for coupling to a complementarily threaded portion of a coupling in fluidic connection with said delivery port;
   a flow control element which can slide in said cavity along said axis of extension of the cavity between a closed position, in which said flow control element affects an inlet of said cavity which can be connected fluidically to a delivery port of an electric pump, and an open position, in which said flow control element clears at least partially said inlet so as to place it in fluidic connection with an outlet of said cavity, elastic means designed to push said flow control element in response to a pressure that is present in said delivery port, wherein said outlet is in fluid connection with an environment the device is located, and wherein said main body comprises a contoured head, wherein said contoured head comprises a plurality of radial openings for an outflow of a liquid, said radial openings being formed in said contoured head and being connected to said outlet, and wherein at least a portion of the flow control element is nearer the inlet than the contoured head; and wherein said main body comprises a first groove which is arranged between said contoured head and said threaded portion, said first groove being adapted to accommodate a first sealing means which can be arranged between said contoured head and said electric pump substantially at said complementarily threaded portion.

2. The device according to claim 1, wherein said contoured head is provided with a seat for the sliding of a pin which protrudes from said flow control element, said sliding seat being formed substantially parallel to said axis of extension.

3. The device according to claim 2, further comprising a secondary body which is associated with said main body and is partially inserted in said cavity, said secondary body forming said inlet and an abutment seat for said flow control element.

4. The device according to claim 3, wherein said flow control element comprises a shoulder which is provided in an opposite position with respect to said pin, said shoulder forming a second groove adapted to accommodate second sealing means which cooperate with said abutment seat in said closed position.

5. The device according to claim 4, wherein said elastic means comprise at least one spring which is mounted coaxially on said flow control element, said spring abutting against said shoulder and against said contoured head substantially at said sliding seat.

6. The device according to claim 5, wherein said spring is calibrated to be compressed elastically when a preset pressure value is exceeded in said delivery port so as to allow an axial sliding of said flow control element and determine a transition from said closed position to said open position.

7. An electric pump, comprising a pump body provided with a chamber adapted to accommodate at least one impeller turned by motor means, said chamber comprising at least one intake port and at least one delivery port, and further comprising at least one device for protection against overpressures according to claim 1.

8. The electric pump according to claim 1, wherein said device is mounted at said delivery port.

* * * * *